(12) United States Patent
Galliou et al.

(10) Patent No.: US 8,278,234 B2
(45) Date of Patent: Oct. 2, 2012

(54) PROCESS FOR THE REGENERATION OF CATALYSTS FOR THE TREATMENT OF HYDROCARBONS

(75) Inventors: Pauline Galliou, Dunieres sur Eyrieux (FR); Eric Nagy, Charmes (FR); Pierre Dufresne, Valence (FR)

(73) Assignee: Eurecat S.A., La Voulte-sur-Rhone (FR)

( * ) Notice: Subject to any disclaimer, the term of this patent is extended or adjusted under 35 U.S.C. 154(b) by 0 days.

(21) Appl. No.: 12/574,381

(22) Filed: Oct. 6, 2009

(65) Prior Publication Data

US 2010/0105541 A1   Apr. 29, 2010

Related U.S. Application Data

(60) Provisional application No. 61/110,644, filed on Nov. 3, 2008.

(30) Foreign Application Priority Data

Oct. 10, 2008   (FR) ...................... 08 56884

(51) Int. Cl.
*B01J 38/02* (2006.01)
(52) U.S. Cl. ....................................... 502/56
(58) Field of Classification Search ........................ None
See application file for complete search history.

(56) References Cited

U.S. PATENT DOCUMENTS

| | | | | |
|---|---|---|---|---|
| 4,520,129 A | * | 5/1985 | Murtha | 502/222 |
| 4,530,917 A | * | 7/1985 | Berrebi | 502/220 |
| 5,017,535 A | * | 5/1991 | Schoonhoven et al. | 502/30 |
| 5,169,819 A | * | 12/1992 | Berrebi | 502/168 |
| 5,417,844 A | * | 5/1995 | Boitiaux et al. | 208/143 |
| 6,872,678 B2 | * | 3/2005 | Eijsbouts | 502/29 |
| 7,087,546 B2 | * | 8/2006 | Eijsbouts et al. | 502/33 |
| 2007/0037695 A1 | | 2/2007 | Brun et al. | |
| 2008/0194892 A1 | | 8/2008 | Cholley et al. | |

FOREIGN PATENT DOCUMENTS

| | | |
|---|---|---|
| EP | 0 300 629 A1 | 1/1989 |
| EP | 0 357 295 A2 | 3/1990 |
| EP | 0 496 592 A1 | 7/1992 |
| EP | 0 575 077 A1 | 12/1993 |
| EP | 0 882 503 A2 | 12/1998 |
| EP | 1 046 424 A1 | 10/2000 |
| EP | 1 577 007 A1 | 9/2005 |
| WO | WO-96/41848 A1 | 12/1996 |
| WO | WO-01/02092 A1 | 1/2001 |

OTHER PUBLICATIONS

EPO Form 1503 12.99 French Preliminary Report on Patentability for FR 0856884, Apr. 8, 2009, Eurecat S.A.
U.S. Appl. No. 12/573,646, Galliou et al.
EPO Form 1503 12.99 French Preliminary Search Report for FR 0856883, Apr. 6, 2009, Eurecat S.A.

* cited by examiner

*Primary Examiner* — Melvin C Mayes
*Assistant Examiner* — Stefanie Cohen
(74) *Attorney, Agent, or Firm* — Edwards Wildman Palmer LLP; Peter C. Lauro, Esq.; Weiying Yang

(57) ABSTRACT

A subject-matter of the present invention is a process for the regeneration of a catalyst comprising at least one metal from Group VIII and at least one metal from Group VIB which are deposited on a refractory oxide support, comprising:
  at least one first step of heat treatment of the catalyst in the presence of oxygen and at a temperature ranging from 350° C. to 550° C.;
  at least one second step of deposition, at the surface of the catalyst, of one or more additive(s) of formula (I):

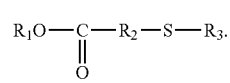

(I)

24 Claims, No Drawings

PROCESS FOR THE REGENERATION OF CATALYSTS FOR THE TREATMENT OF HYDROCARBONS

RELATED APPLICATIONS

This application claims priority to French patent application No. 08 56884, filed Oct. 10, 2008, and U.S. provisional patent application Ser. No. 61/110,644, filed Nov. 3, 2008. The entire disclosures of each of the aforementioned patent applications are incorporated herein by this reference.

BACKGROUND OF THE INVENTION

The processes for the treatment of hydrocarbons carried out in refineries and/or petrochemistry units include a number of treatments carried out in the presence of hydrogen and which are intended to modify the structure of the hydrocarbon molecules and/or to remove undesirable compounds from the hydrocarbon fractions, such as in particular sulphur-comprising, nitrogen-containing or aromatic compounds. Mention may be made, as non-limiting examples, of hydrocracking, reforming or hydrogenation processes and "hydrotreating" processes, such as hydrodesulphurization, hydrodenitrogenation, hydrodearomatization or hydrodemetallization.

These processes involve specific catalysts which comprise a porous support based on one or more refractory inorganic oxides on which are deposited one or more catalytically active metals comprising at least one metal from Group VIII of the Periodic Table of the Elements, generally in combination with one or more metals from Group VIB.

During their use, these catalysts gradually become deactivated, in particular due to the deposition of coke at their surface, that is to say of a mixture of heavy hydrocarbons, of carbon residues and of metal impurities.

For the sake of economy and preserving the environment, there is increasingly a search henceforth to reuse these catalysts after their cycle of use.

"Regeneration" processes have thus been developed, which consist in treating the spent catalysts in order to restore their activity to a level sufficient to allow them to be reemployed.

The regeneration of spent catalysts is conventionally carried out by combusting the coke, the catalyst being heated to a high temperature in the presence of a gas comprising oxygen. It can be carried out in situ (that is to say, directly in the unit, after shutting it down) or ex situ (that is to say, after discharging the catalyst from the unit).

However, after their first regeneration, these catalysts exhibit an activity which is sometimes markedly inferior to their initial activity in the fresh state.

For this reason, "rejuvenation" processes have recently been developed in which the regenerated catalysts are impregnated with an organic additive with the aim of bringing their activity back to a level as close as possible to that of a fresh catalyst.

Thus, Patent Application WO 96/41848 describes a process for the activation of a hydrotreating catalyst comprising an oxide of a metal from Group VIII and an oxide of a metal from Group VI which are deposited on a support. According to this process, the catalyst is brought into contact with an additive which is a compound comprising at least 2 hydroxyl groups and from 2 to 10 carbon atoms, or a (poly)ether of such a compound, and then the catalyst is dried under conditions such that at least 50% of the additive remains present on the catalyst.

This process can be applied to a fresh catalyst, the activity of which it is desired to increase, or to a spent catalyst, which has been subjected beforehand to a regeneration step. The preferred additives are ethylene glycol, diethylene glycol and polyethylene glycols.

Patent Application EP 0 882 503 describes a process for the regeneration of a spent catalyst comprising a support based on gamma-alumina and on amorphous alumina impregnated with one or more catalytically active metals, in which:

(1) the spent catalyst is treated in order to remove carbon-based deposits;

(2) the support thus treated is wetted using a chelating agent in a supporting liquid;

(3) the support, thus wetted, is subjected to an ageing phase;

(4) the support is dried, so as to evaporate the supporting liquid;

(5) the support, thus dried, is calcined.

The chelating agents cited are ethylenediaminetetraacetic acid (EDTA) and its derivatives, such as, for example, N-hydroxy-EDTA and diammonium-EDTA, tri(2-aminoethyl)amine, triethylenetetraamine, diethylenetriaminepentaacetic acid, cyclohexanediaminetetraacetic acid, ethylene glycol bis (β-amino ethyl ether) N,N'-tetraacetic acid and tetraethylenepentaamine.

Patent Application WO 01/02092 describes a process for regenerating and rejuvenating a spent additivated catalyst comprising a step of regeneration of the catalyst by bringing it into contact with an oxygen-comprising gas at a maximum temperature of 500° C. and then a step of rejuvenation of the catalyst by bringing the latter into contact with an organic additive, optionally followed by drying at a temperature such that at least 50% of the additive remains present on the catalyst.

The regeneration temperature is preferably between 350 and 425° C. The organic additive employed in this process can be any compound comprising at least one carbon atom and one hydrogen atom.

However, the methods described in the prior art exert a number of disadvantages and in particular they do not always make it possible to achieve a satisfactory level of activity for the recycled catalyst.

SUMMARY OF THE INVENTION

The present invention provides a process for regenerating catalysts intended for the treatment of hydrocarbons in the field in particular of oil refining and petrochemistry. More particularly, the present invention provides a process intended to regenerate spent catalysts for the hydrotreating and/or hydroconversion of hydrocarbons, in order to restore a satisfactory level of activity to them at least approaching that of a fresh catalyst.

The present invention also provides regenerated catalysts obtained by this process.

The present invention still further provides the use of specific additives in order to increase the activity of these catalysts.

A goal of the present invention is to provide an improved method for regenerating spent catalysts based on metals from Groups VIII and VIB which makes it possible to overcome the disadvantages of the methods of the prior art and to obtain an at least equivalent, and even better, level of activity.

This goal is achieved by means of a process employing the combination of two steps, a first step of combustion of the coke under controlled temperature conditions, followed by a second step of deposition of a specific additive at the surface of the catalyst.

Thus, one aspect of the present invention is a process for the regeneration of a catalyst comprising at least one metal from Group VIII and at least one metal from Group VIB which are deposited on a refractory oxide support, comprising:

at least one first step of heat treatment of the catalyst in the presence of oxygen and at a temperature ranging from 350° C. to 550° C.;

at least one second step of deposition, at the surface of the catalyst, of one or more additive(s) of formula (I):

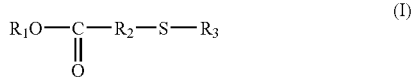

in which:
$R_1$ denotes a hydrogen atom or a saturated or unsaturated, linear or branched hydrocarbon group comprising from 1 to 30 carbon atoms;
$R_2$ denotes a saturated or unsaturated, linear or branched divalent hydrocarbon group comprising from 1 to 30 carbon atoms which can optionally comprise one or more heteroatom(s) chosen from oxygen and nitrogen atoms;
$R_3$ denotes a saturated or unsaturated, linear or branched hydrocarbon group comprising from 1 to 30 carbon atoms.

The process according to the invention makes it possible to restore an excellent level of activity to the catalyst which is greater than that found with some processes of the prior art.

In addition, the additives of formula (I) are easy to employ.

Still further, in comparison with the regeneration processes described in the prior art, the process according to the invention has proved to exhibit the additional advantage of resulting in a presulphurization of the catalyst.

This is because catalysts based on metals from Groups VIII and VIB are active in the form of metal sulphides. This is why, immediately before the use of the catalyst, it is known to carry out a sulphurization of the latter, for the purpose of activating the metal catalytic sites by conversion of the metal oxides to metal sulphides.

This sulphurization is carried out by bringing the catalyst into contact with one or more sulphurization agents, such as, in particular, hydrogen sulphide, elemental sulphur, $CS_2$, organic sulphur compounds, such as mercaptans, sulphides or polysulphides, or hydrocarbon fractions naturally comprising sulphur compounds and/or enriched in sulphur compounds.

The process according to the invention has proved to make it possible to simultaneously carry out, in addition to the regeneration proper of the catalyst, a first fixing of the sulphur, this being carried out by means of one and the same additive. This makes it possible to obtain a regenerated catalyst which exists in the presulphurized form.

Thus, the process according to the invention makes it possible to substantially facilitate the final sulphurization treatment carried out at the time of the use of the recycled catalyst.

DETAILED DESCRIPTION OF THE INVENTION

The process according to the present invention comprises a first step of heat treatment of the catalyst which consists in heating the latter at a temperature ranging from 350° C. to 550° C. in the presence of oxygen. The aim of this step is to remove the coke present at the surface of the catalyst by combustion of the coke.

Strict control of the temperature in the catalyst is advantageous during this step. This is because the temperature has to be sufficiently high to allow a combustion of the coke which is as complete as possible. However, it is advantageous that the temperature not exceed 550° C., even locally, as this would have the effect of damaging the catalyst, for example by causing a deterioration in the porosity of the latter.

In one embodiment, the first step of heat treatment is carried out at a temperature of less than or equal to 530° C. and advantageously less than or equal to 520° C.

According to a specific embodiment of the invention, the first step of heat treatment is carried out, in all or in part, at a temperature of greater than 500° C. and less than or equal to 550° C.

This specific embodiment makes it possible to more rapidly and more completely remove the coke and other impurities. However, this requires precise control of the temperature, so that the latter does not exceed, locally, 550° C.

The temperature in the catalyst can be controlled in a way known per se, for example by means of thermocouples appropriately positioned in the body of the catalyst.

The first step is carried out in the presence of oxygen, for example by means of a stream of gas comprising oxygen. This gas can be composed, for example, of air, pure or mixed with additional oxygen or with an inert gas, so as to increase or reduce the oxygen content of the air. This gas can also be composed of a mixture of oxygen and of inert gas, such as nitrogen, or of other gas mixtures comprising oxygen.

The oxygen content of the gas is advantageously controlled, so as to better control the combustion temperature. This content can be steady or, on the other hand, can vary over time during the first step.

The gas flow rate is also controlled, so as to control the combustion.

The first step can comprise several phases carried out at different temperatures and/or in the presence of variable amounts of oxygen.

The total duration of this first step generally depends on the amount of catalyst to be treated, on the composition of the latter, on the amount of coke present at its surface and on the operating conditions (temperature, oxygen content). This duration decreases as the temperature increases. In certain embodiments, it is generally between 0.1 and 20 hours, advantageously between 0.2 and 10 hours.

The process according to the present invention comprises a second step during which one or more additive(s) of formula (I) is(are) deposited at the surface of the catalyst.

According to one embodiment, the additive or additives of formula (I) comprise(s) only one sulphur atom.

In certain embodiments, in the formula (I), $R_1$ denotes a hydrogen atom or a saturated or unsaturated, linear or branched hydrocarbon group comprising from 1 to 8 carbon atoms and advantageously from 1 to 4 carbon atoms.

In certain embodiments, $R_2$ denotes a saturated or unsaturated, linear or branched divalent hydrocarbon group comprising from 1 to 8 carbon atoms, advantageously from 1 to 6 carbon atoms which can be substituted by one or more —OH, —OR, —$NH_2$, —NHR or —NRR' groups, with R and R' denoting alkyl groups comprising from 1 to 4 carbon atoms and advantageously 1 or 2 carbon atoms.

In certain embodiments, $R_3$ denotes a saturated or unsaturated, linear or branched hydrocarbon group comprising from 1 to 8 carbon atoms and preferably from 1 to 4 carbon atoms.

According to a specific embodiment, in the formula (I):

$R_1$ denotes a hydrogen atom or an alkyl group comprising 1 or 2 carbon atoms and, preferably, $R_1$ denotes a hydrogen atom;

$R_2$ denotes an alkyl group comprising from 1 to 5 carbon atoms which can be substituted by one or more —OH groups;

$R_3$ denotes an alkyl group comprising 1 or 2 carbon atoms and, preferably, $R_1$ denotes a methyl group.

According to a particularly advantageous embodiment of the invention, the additive of formula (I) is 2-hydroxy-4-methylthiobutanoic acid, that is to say that, in the formula (I): $R_1$ denotes a hydrogen atom, $R_2$ denotes a —CHOH—$CH_2$—$CH_2$— group and $R_3$ denotes a methyl group.

This embodiment is particularly advantageous insofar as the additive is easy to prepare and inexpensive, since this is a compound which is similar to the amino acid methionine and which can be synthesized by similar routes.

In addition, this additive exhibits the additional advantage of being completely soluble in water, which allows it to be employed in the form of an aqueous solution.

The additive of formula (I) is deposited at the surface of the catalyst by bringing the catalyst into contact with this additive. It is possible to proceed in several ways, for example by bringing the catalyst into contact with the pure additive (in particular in the liquid or gas form), or with a composition comprising the additive in a carrier fluid which can be liquid, gaseous or supercritical. In certain embodiments, the additive of formula (I) is deposited by bringing the catalyst into contact with a solution or suspension of the additive in a carrier liquid.

Thus, in one particularly advantageous embodiment, the catalyst is impregnated using a solution or dispersion of the additive in an appropriate aqueous and/or organic liquid.

In another particularly advantageous embodiment of the invention, the additive or additives of formula (I) is (are) deposited on the catalyst by impregnation with one or more aqueous solution(s) of the (of these) additive(s).

Advantageously, the aqueous solution(s) employed does (do) not comprise organic cosolvent.

It is possible to proceed by dry impregnation of the catalyst (that is to say, using a solution having a volume less than or equal to the pore volume of the catalyst), by impregnation of the catalyst in the presence of an excess of solution or by dipping the catalyst in an excess of solution.

This bringing of the catalyst into contact with the additive can be instantaneous or can last up to 20 hours. In certain embodiments, this contacting operation lasts approximately 2 hours, advantageously approximately 1 hour. In certain embodiments, it can be carried out at a pressure ranging from atmospheric pressure to 5 bar, advantageously at atmospheric pressure.

If solvent remains, it is subsequently removed, for example by heating, so as to cause it to evaporate, or by suction, or by drying using a gas stream, optionally in the presence of heating. In any case, the removal of the residual solvent, if appropriate, must be carried out so as to retain all, or at least a substantial part, of the additive deposited at the surface of the catalyst and to prevent the additive from decomposing.

It is also possible to carry out a step of maturing of the catalyst, before or after removing the excess of solvent, at ambient temperature or in the presence of gentle heating, which can range up to 100° C.

In certain embodiments, this maturing can be carried out for a period of time ranging from 0.1 to 100 hours, advantageously from 0.2 to 20 hours, more advantageously from 1 to 10 hours.

Generally, the second step must be carried out under conditions which make possible the deposition, at the surface of the catalyst, of a sufficient amount of additive of formula (I), so as to obtain a satisfactory level of activity.

Preferably, at the end of the second step, the total amount of additive(s) of formula (I) deposited at the surface of the catalyst, expressed as being the ratio of the molar amount of additive(s) of formula (I) to the total molar amount of metals from Groups VIII and VIB, is at least 0.01 mol of additive(s) per mole of metals from Groups VIII and VIB. Preferably, this amount is between 0.01 and 10 mol of additive(s) per mole of metals from Groups VIII and VIB, more preferably between 0.05 and 5 mol and more preferably still between 0.1 and 1.5 mol.

During the second step, it is also possible to deposit, in addition to the additive(s) of formula (I), one or more additional organic or inorganic additives, either simultaneously with the deposition of the additive(s) of formula (I) or before and/or after the deposition of the additive(s) of formula (I). Such an additional deposition should, however, be carried out under conditions such that that it does not prejudice the deposition of the additive of formula (I) or its activity.

The regeneration process according to the invention can, in addition to the two steps described above, optionally comprise one or more additional steps carried out before and/or after the said first and second steps or also intercalated between these two steps.

Thus, the process according to the invention can advantageously comprise, before the said first step, a step of removal of the free impurities and hydrocarbons included in the catalyst.

This step can be carried out by washing the catalyst. Such a washing can be carried out using an appropriate solvent, such as, for example, toluene, xylenes, acetone or any other appropriate solvent.

This step can also advantageously be carried out by stripping using a stream of gas, for example air, steam, carbon dioxide or an inert gas, such as nitrogen, at a temperature, for example, of between 100 and 450° C.

The process according to the invention can also comprise, after the said second step, a step of drying the catalyst which can be carried out at a temperature ranging from 80° C. to 350° C., preferably from 100° C. to 200° C., in the open air or in the presence of a gas stream of air, of an inert gas, such as nitrogen, or of any other appropriate gas.

The process according to the invention can also optionally comprise, after the said second step, a step of calcination of the catalyst which can be carried out at a temperature ranging from 300° C. to 500° C., in the open air or in the presence of a gas stream of air, of an inert gas, such as nitrogen, or of any other appropriate gas.

When the process according to the invention already comprises a step of drying the catalyst, the calcination step (if one is present) is then carried out after the drying step.

In certain embodiments, at the end of the process according to the invention and before any step of conventional sulphurization, the amount of sulphur present at the surface of the catalyst ranges from 0.5 to 8% by weight, preferably from 1 to 5% by weight, with respect to the total weight of the catalyst. More preferably, the amount of sulphur present at the surface of the catalyst ranges from 2 to 3% by weight, with respect to the total weight of the catalyst.

At the end of the process according to the invention, immediately before the use of the recycled catalyst, it is advantageous to carry out a final conventional sulphurization by bringing the catalyst into contact with one or more sulphurizing agents. This sulphurization can be preceded or accompanied by an activation in the presence of hydrogen.

The corresponding sulphurizing agents are conventional compounds chosen, for example, from hydrogen sulphide, elemental sulphur, $CS_2$, organic sulphur compounds, such as mercaptans, sulphides, disulphides or polysulphides, or hydrocarbon fractions naturally comprising sulphur compounds and/or enriched in sulphur compounds.

However, according to the present invention, the duration and/or the intensity of the sulphurization can be substantially reduced, in comparison with the processes of the prior art, since the catalyst is provided in a form which is already presulphurized. This results in a saving in time and in a saving in sulphurizing agents, which are for the most part aggressive and polluting compounds.

When the regenerated catalyst is employed in a process for the treatment of a hydrocarbon feedstock comprising sulphur compounds, it can also be possible to carry out the step of activation of the catalyst directly with the feedstock without adding sulphur compounds thereto, relying only on the sulphur present in the feedstock to complete the sulphurization of the catalyst at the necessary stoichiometry. This constitutes a particularly advantageous embodiment of the invention.

The process according to the present invention can be carried out in situ, that is to say directly in the unit in which the catalyst is employed.

According to a preferred embodiment, it is carried out ex situ, that is to say after discharging the catalyst from the unit.

The process according to the invention can also comprise some steps carried out in situ, the others being carried out ex situ.

The process according to the present invention makes it possible to regenerate any spent catalyst for the hydrotreating and/or hydroconversion of hydrocarbons in the refining and petrochemistry fields.

They are catalysts comprising at least one metal from Group VIII of the Periodic Table of the Elements, such as, for example, cobalt, nickel, iron, platinum or palladium, in combination with at least one metal from Group VIB, such as, for example, molybdenum, tungsten or chromium. The content of metal or metals from Group VIII is generally between 0.1 and 10% by weight, with respect to the total weight of the catalyst, and the content of metal or metals from group VIB is generally between 1 and 20% by weight, with respect to the total weight of the catalyst.

These metals are deposited on a support based on one or more refractory inorganic oxides, such as, in particular, aluminas, silicas, silica/aluminas, zeolites, zirconias, titanium and boron oxides, and mixtures of such oxides.

The process according to the invention is particularly appropriate for the regeneration of catalysts comprising CoMo, NiMo, NiW or NiCoMo metal combinations deposited on alumina-based supports.

The spent catalysts may comprise, or may have comprised, in the fresh state or as a consequence of a preceding recycling, one or more additives, such as organic additives, halogen compounds, boron compounds or phosphorus compounds.

The catalysts involved in the process according to the invention are generally provided in the form of small solid particles, such as beads, more or less cylindrical particles, or extrudates. They exhibit a specific surface, measured by the BET method, generally between 100 and 300 $m^2/g$, a pore volume, determined by nitrogen adsorption, ranging from 0.25 to 1 ml/g and a mean pore diameter, determined by nitrogen adsorption, ranging from 7 to 20 nm.

The present invention also relates to the regenerated catalysts obtained by means of the process described above. These catalysts exhibit a particularly satisfactory level of activity and exhibit the additional advantage of being presulphurized, as has been explained above.

Another subject-matter of the present invention is the use of one or more additive(s) of formula (I) as described above in order to increase the activity of a catalyst comprising at least one metal from Group VIII and at least one metal from Group VIB which are deposited on a refractory oxide support.

The catalyst involved in this use can be a fresh catalyst or a spent catalyst which has been regenerated beforehand by at least partial removal of the coke.

The examples which follow are given purely by way of illustration of the present invention.

EXAMPLES

Example 1

This example was carried out starting from a spent commercial catalyst comprising 23.1% by weight of $MoO_3$, 4.2% by weight of CoO, 12.4% by weight of carbon and 14.5% by weight of sulphur.

A portion of this spent catalyst was subjected to a heat treatment at a temperature of 400° C. under air for a period of time of 2 hours, in order to obtain the treated catalyst T1.

The procedure consists in placing 100 g (equivalent dry weight) of catalyst in 5 glass crucibles, in introducing the latter into a muffle furnace preheated to 300° C., in remaining at this temperature for 1 hour, in bringing the furnace to 400° C. and in remaining at this temperature for 2 hours.

An identical portion of this same spent catalyst was subjected to a heat treatment according to the same procedure but with a temperature of 520° C. for a period of time of 2 hours for the final stationary phase, in order to obtain the treated catalyst T2.

The characteristics of the catalysts T1 and T2 appear in the table below:

|  | T1 | T2 |
| --- | --- | --- |
| Carbon content (% by weight) | 1.3 | 0.2 |
| Sulphur content (% by weight) | 0.4 | 0.2 |
| Specific surface ($m^2/g$) | 175 | 181 |

100 g of the catalyst T1 were impregnated to saturation of the pore volume with a solution composed of 10 g of polyethylene glycol 200 (PEG-200) and of 33 g of demineralized water.

After impregnation, the sample was subjected to a step of maturing at a temperature of 70° C. for 8 hours and then dried under nitrogen in an oven at 140° C. in order to obtain the comparative regenerated catalyst A1.

100 g of the catalyst T1 were impregnated to saturation of the pore volume with a solution composed of 14.2 g of a commercial 88% by weight solution of 2-hydroxy-4-methylthiobutanoic acid (i.e., 12.5 g of 2-hydroxy-4-methylthiobutanoic acid) and of 36 g of demineralized water.

After impregnation, the sample was subjected to a step of maturing at a temperature of 70° C. for 8 hours and then dried under nitrogen in an oven at 140° C. in order to obtain the regenerated catalyst according to the invention A2. This catalyst comprises 4.2% by weight of carbon and 2.3% by weight of sulphur.

100 g of the catalyst T2 were impregnated to saturation of the pore volume with a solution composed of 14.2 g of a commercial 88% by weight solution of 2-hydroxy-4-methylthiobutanoic acid (i.e., 12.5 g of 2-hydroxy-4-methylthiobutanoic acid) and of 36 g of demineralized water.

After impregnation, the sample was subjected to a step of maturing at a temperature of 70° C. for 8 hours and then dried under nitrogen in an oven at 140° C. in order to obtain the regenerated catalyst according to the invention A3. This catalyst comprises 4.4% by weight of carbon and 2.4% by weight of sulphur.

The activities of the catalysts T1 and T2 and A1 to A3 in the hydrodesulphurization of hydrocarbons were then compared, the protocol described below being followed.

The feedstock used is a straight run gas oil which exhibits the following characteristics:

| | |
|---|---|
| Sulphur content (ppm by weight) | 12 200 |
| Nitrogen content (ppm by weight) | 94 |
| Density (g/ml) | 0.837 |

For each sample, the volume of catalyst employed for the test was 10 ml.

Before the hydrodesulphurization test, each catalyst sample was activated by sulphurization after a period of wetting for 3 hours at ambient temperature with gas oil additivated with 2.5% by weight of sulphur using dimethyl disulphide (DMDS). The sulphurization process was carried out with an hourly space velocity (HSV) of 3 h$^{-1}$, with an H$_2$/additivated gas oil ratio of 200 (Sl/h)/(l/h) and a total pressure of 3 MPa (30 bar). A first temperature gradient from ambient temperature to 250° C. was performed with a gradient of 30° C./h, followed by a stationary phase of 8 h at 250° C. A second temperature gradient from 250° C. to 320° C. was subsequently performed with a gradient of 20° C./h, followed by a stationary phase of 5 h at 320° C.

The test feedstock was then injected in order to initiate the test. The test conditions were as follows: pressure of 3 MPa, H$_2$/gas oil ratio of 300, HSV=2 h$^{-1}$, temperature from 340 to 350° C.

The sulphur content of the feedstock was measured at the outlet of the unit using a UV fluorescence analyser. The apparent constants of the desulphurization reaction were calculated according to the following formula E1:

$$K_v = \left(\frac{1}{\alpha - 1}\right)\left(\frac{1}{S^{\alpha-1}} - \frac{1}{S_0^{\alpha-1}}\right) * HSV \quad (E1)$$

with

K$_v$=apparent reaction constant

α=order of reaction (regarded as equal to 1.2)

S=sulphur content of the effluents

S$_0$=sulphur content of the feedstock

HSV=hourly space velocity of the liquid feedstock

The performance of each sample was evaluated with respect to that of a reference catalyst. For this, the relative volume activity (RVA) was calculated according to the following formula E2:

$$RVA = \frac{Kv(\text{sample})}{Kv(\text{reference})} \times 100 \quad (E2)$$

The K$_v$ value of 100 was assigned to the treated catalyst T2 as reference.

The results obtained are collated in the table below:

| Catalyst | Temperature of the heat treatment | Additive | RVA (%) |
|---|---|---|---|
| Treated catalyst T1 | 400° C. | No | 106 |
| Treated catalyst T2 | 520° C. | No | 100 |
| Comparative regenerated catalyst A1 | 400° C. | PEG-200 | 129 |
| Regenerated catalyst according to the invention A2 | 400° C. | 2-Hydroxy-4-methylthiobutanoic acid | 142 |
| Regenerated catalyst according to the invention A3 | 520° C. | 2-Hydroxy-4-methylthiobutanoic acid | 155 |

The results which appear in the above table show that the catalysts A2 and A3, regenerated by means of a process according to the invention, are more active than the treated catalysts T1 and T2 and than the comparative regenerated catalyst A1.

Example 2

The regenerated catalysts A4 and A5 according to the invention were prepared in an identical manner to the respective catalysts A2 and A3 of Example 1 above but while doubling the amount of additive (2-hydroxy-4-methylthiobutanoic acid) employed during the second step, so as to increase the sulphur content of the regenerated catalyst (pre-sulphurization):

100 g of the catalyst T1 were impregnated to saturation of the pore volume with a solution composed of 28.4 g of a commercial 88% by weight solution of 2-hydroxy-4-methylthiobutanoic acid (i.e., 25 g of 2-hydroxy-4-methylthiobutanoic acid) and of 24.5 g of demineralized water.

After impregnation, the sample was subjected to a step of maturing at a temperature of 70° C. for 8 hours and then dried under nitrogen in an oven at 140° C. in order to obtain the regenerated catalyst according to the invention A4. This catalyst comprises 8.2% by weight of carbon and 4.3% by weight of sulphur.

100 g of the catalyst T2 were impregnated to saturation of the pore volume with a solution composed of 28.4 g of a commercial 88% by weight solution of 2-hydroxy-4-methylthiobutanoic acid (i.e., 25 g of 2-hydroxy-4-methylthiobutanoic acid) and of 24.5 g of demineralized water.

After impregnation, the sample was subjected to a step of maturing at a temperature of 70° C. for 8 hours and then dried under nitrogen in an oven at 140° C. in order to obtain the regenerated catalyst according to the invention A5. This catalyst comprises 8.1% by weight of carbon and 4.5% by weight of sulphur.

The activities of the catalysts A4 and A5 in the hydrodesulphurization of hydrocarbons were then tested, a protocol identical to that described in Example 1 above being followed, with the exception of the treatment for activation by sulphurization, which is carried out with the same gas oil as in Example 1 but not additivated with DMDS. As for the rest, the sulphurization procedure remains absolutely identical to that of Example 1, and also the hydrodesulphurization test in itself.

The results obtained are collated in the following table:

| Catalyst | Temperature of the heat treatment | Additive | RVA (%) |
|---|---|---|---|
| Regenerated catalyst according to the invention A4 | 400° C. | 2-Hydroxy-4-methylthiobutanoic acid | 139 |
| Regenerated catalyst according to the invention A5 | 520° C. | 2-Hydroxy-4-methylthiobutanoic acid | 150 |

The results which appear in the above table show that the catalysts A4 and A5, regenerated by means of the process according to the invention while employing a greater amount of 2-hydroxy-4-methylthiobutanoic acid, exhibit an activity comparable to that of the catalysts A2 and A3 and greater than that of the comparative catalyst A1.

Thus, the process according to the invention makes it possible to prepare catalysts, the activation of which does not require the use of specific sulphurizing agents but can, in contrast, be carried out directly with the gas oil to be desulphurized.

Incorporation by Reference

The contents of all references (including literature references, issued patents, published patent applications, and co-pending patent applications) cited throughout this application are hereby expressly incorporated herein in their entireties by reference.

Equivalents

Those skilled in the art will recognize, or be able to ascertain using no more than routine experimentation, many equivalents of the specific embodiments of the invention described herein. Such equivalents are intended to be encompassed by the following claims.

What is claimed is:

1. A process for the regeneration of a catalyst comprising at least one metal from Group VIII and at least one metal from Group VIB which are deposited on a refractory oxide support, comprising:
   1) heat treating the catalyst in the presence of oxygen and at a temperature ranging from 350° C. to 550° C.; and
   2) depositing at the surface of the catalyst one or more additive(s) of formula (I):

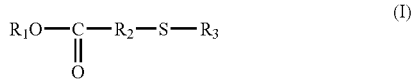

(I)

in which:
$R_1$ denotes a hydrogen atom or a saturated or unsaturated, linear or branched hydrocarbon group comprising from 1 to 30 carbon atoms;
$R_2$ denotes a saturated or unsaturated, linear or branched divalent hydrocarbon group comprising from 1 to 30 carbon atoms which can optionally comprise one or more heteroatom(s) chosen from oxygen and nitrogen atoms;
$R_3$ denotes a saturated or unsaturated, linear or branched hydrocarbon group comprising from 1 to 30 carbon atoms.

2. The process according to claim 1, characterized in that the said first step is carried out at a temperature of less than or equal to 530° C.

3. The process according to claim 1, characterized in that the said first step is carried out, in all or in part, at a temperature of greater than 500° C. and less than or equal to 550° C.

4. The process according to claim 1, wherein $R_1$ denotes a hydrogen atom or a saturated or unsaturated, linear or branched hydrocarbon group comprising from 1 to 8 carbon atoms.

5. The process according to claim 4, wherein $R_1$ denotes a hydrogen atom or a saturated or unsaturated, linear or branched hydrocarbon group comprising from 1 to 4 carbon atoms.

6. The process according to claim 1, wherein $R_2$ denotes a saturated or unsaturated, linear or branched divalent hydrocarbon group comprising from 1 to 8 carbon atoms, which can be substituted by one or more —OH, —OR, —NH$_2$, —NHR or —NRR' groups, with R and R' denoting alkyl groups comprising from 1 to 4 carbon atoms.

7. The process according to claim 6, wherein $R_2$ denotes a saturated or unsaturated, linear or branched divalent hydrocarbon group comprising from 1 to 8 carbon atoms, which can be substituted by one or more —OH, —OR, —NH$_2$, —NHR or —NRR' groups, with R and R' denoting alkyl groups comprising from 1 to 2 carbon atoms.

8. The process according to claim 6, wherein $R_2$ denotes a saturated or unsaturated, linear or branched divalent hydrocarbon group comprising from 1 to 6 carbon atoms, which can be substituted by one or more —OH, —OR, —NH$_2$, —NHR or —NRR' groups, with R and R' denoting alkyl groups comprising from 1 to 4 carbon atoms.

9. The process according to claim 1, wherein $R_3$ denotes a saturated or unsaturated, linear or branched hydrocarbon group comprising from 1 to 8 carbon atoms.

10. The process according to claim 9, wherein $R_3$ denotes a saturated or unsaturated, linear or branched hydrocarbon group comprising from 1 to 4 carbon atoms.

11. The process according to claim 9, wherein $R_3$ denotes a saturated or unsaturated, linear or branched hydrocarbon group comprising from 1 to 4 carbon atoms.

12. The process according to claim 1, characterized in that the additive of formula (I) is 2-hydroxy-4-methylthiobutanoic acid.

13. The process according to claim 1, wherein the additive or additives of formula (I) is (are) deposited on the catalyst by impregnation with one or more aqueous solution(s) of the additive(s).

14. The process according to claim 1, characterized in that, at the end of the said second step, the total amount of additive(s) of formula (I) deposited at the surface of the catalyst, expressed as the ratio of the molar amount of additive(s) of formula (I) to the total molar amount of metals from Groups VIII and VIB, is at least 0.01 mol of additive(s) per mole of metals from Groups VIII and VIB.

15. The process according to claim 14, characterized in that, at the end of the said second step, the total amount of additive(s) of formula (I) deposited at the surface of the catalyst is between 0.01 and 10 mol of additive(s) per mole of metals from Groups VIII and VIB.

16. The process according to claim 1, characterized in that it comprises one or more additional steps carried out before and/or after the said first and second steps or also intercalated between these two steps.

17. The process according to claim 16, characterized in that it comprises, before the said first step, a step of removal of the free impurities and hydrocarbons by washing the catalyst with a solvent or by stripping using a stream of gas.

18. The process according to claim 16, characterized in that it comprises, after the said second step, a step of drying the catalyst, carried out at a temperature ranging from 80° C. to 350° C., in the open air or in the presence of a gas stream of air, of an inert gas, or of any other appropriate gas.

19. The process according to claim 18, wherein the inert gas is nitrogen.

20. The process according to claim 1, characterized in that it is carried out ex situ.

21. The process according to claim 1, characterized in that, at the end of this process and before any additional step of sulphurization, the amount of sulphur present at the surface of the catalyst ranges from 0.5 to 8% of the total weight of the catalyst.

22. The process according to claim 21, wherein the amount of sulphur present at the surface of the catalyst ranges from 1 to 5% by weight.

23. A regenerated catalyst obtained through the process according to claim 1.

24. A method to increase the activity of a catalyst comprising at least one metal from Group VIII and at least one metal from Group VIB which are deposited on a refractory oxide support, comprising contacting said catalyst with one or more additive(s) of formula (I):

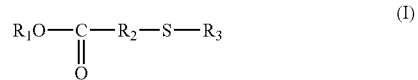

in which:
- $R_1$ denotes a hydrogen atom or a saturated or unsaturated, linear or branched hydrocarbon group comprising from 1 to 30 carbon atoms;
- $R_2$ denotes a saturated or unsaturated, linear or branched divalent hydrocarbon group comprising from 1 to 30 carbon atoms which can optionally comprise one or more heteroatom(s) chosen from oxygen and nitrogen atoms;
- $R_3$ denotes a saturated or unsaturated, linear or branched hydrocarbon group comprising from 1 to 30 carbon atoms, thereby increasing the activity of said catalyst.

\* \* \* \* \*